Oct. 3, 1961    R. Y. ALTENBURG    3,002,286
AIR CIRCUIT GAUGE
Filed July 6, 1959

INVENTOR.
ROBERT Y. ALTENBURG
BY
Barnes, Kisselle, Raisch & Choate
ATTORNEYS

United States Patent Office 3,002,286
Patented Oct. 3, 1961

3,002,286
AIR CIRCUIT GAUGE
Robert Y. Altenburg, Detroit, Mich., assignor to Freeland Gauge Company, Detroit, Mich., a corporation of Michigan
Filed July 6, 1959, Ser. No. 825,008
4 Claims. (Cl. 33—174)

This invention relates to an air circuit gauge and is particularly directed to a gauge for checking the center distance between holes with a single instrument, that is, with an instrument containing a single air tube.

As far as is known, in the past, gauge manufacturers have used a system for checking center distances which required multiple reading devices whether they be air tubes or the needle type of devices.

The present invention contemplates center distance reading with a single reading whether it be an air tube or visual needle dial.

It is also an object of the present device to provide a checking unit of the type described which is independent of the hole size in the sense that the holes being checked for center relationship do not need to be the same size.

It is a further object to provide a checking device which is not affected by the porosity or surface finish of the material being checked.

Other objects and features of the invention relating to details of construction and operation will be apparent in the following description and claims.

Figure 1:
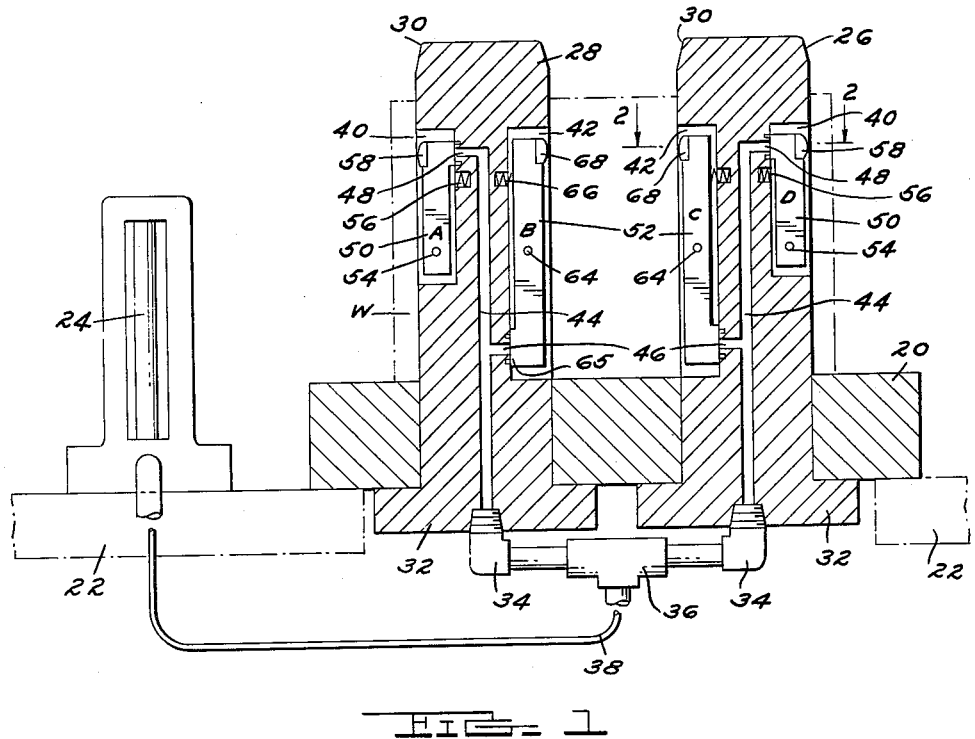

Drawings accompany the disclosure and the various views thereof may be briefly described as:

FIGURE 1, a vertical section of a gauging device showing the parts thereof in conjunction with a diagrammatic view of a reading instrument.

Figure 2:
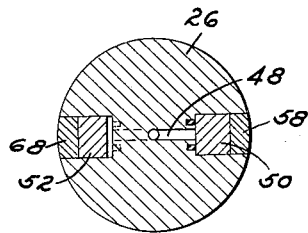

FIGURE 2, a sectional view on line 2—2 of FIGURE 1.

Referring to the drawings, a base plate 20 for the gauge is suitably mounted on a table 22 which also supports a visual indicator device in the form of an air flow tube 24 of the type disclosed in U.S. Patent to Aller 2,254,259, dated September 2, 1941.

In the gauge plate 20 are mounted two cylindrical posts 26 and 28 having tapered ends 30 to facilitate the application of a work part. The cylindrical posts 26 and 28 have a base 32 which locates against the bottom of the base plate 20 and in which are connecting nipples 34 joined by a common pipe and T 36 leading to a conduit 38 of the indicator 24.

Each gauge post is provided with a pair of side recesses 40 and 42, the recess 40 being relatively shorter than the recess 42 and these recesses being on diametrically opposed sides of the posts 26 and 28. A central passage 44 passes upwardly from the connecting nipple 34 and has a radial outlet 46 at the lower end of the recess 42 and a radial outlet 48 at the upper end of the recess 40. The recesses 40 and 42 are rectangular in shape. Each recess contains a feeler block 50 and 52 respectively.

Each feeler block 50 is pivoted at its lower end at pivot 54 in the recess 40 and biased outwardly by a spring 56 at the top. Each upper end of the block 50 is provided with a contact insert 58 preferably formed of a wear material such as tungsten carbide. The back surface of the feeler block 50 is stepped so that a projecting portion behind the insert 58 overlies and contacts the surface around the opening 48.

Each feeler block 52 is pivoted centrally at pivot 64 and the lower end of the block is provided with a slight projection 65 in a stepped surface, this projection 65 overlying the radial port 46. Each upper end of the block 52 is biased outwardly by a spring 66 which urges the lower end in contact with the annular portion around the port 46. The upper end is also provided with a tungsten carbide insert 68 to serve as a wear point. Around each orifice 46 and 48 are provided annular recesses of the type commonly used in gauging orifices.

In dotted lines a workpiece "W" is shown disclosed over the checking posts 26 and 28, the workpiece having parallel holes to be checked for center distance. The feeler blocks are marked A, B, C and D from left to right across the drawing to facilitate the description of the operation. For example, if the holes in the workpiece W are too close together, then the feeler block A is pressed in, the feeler block B is out, the feeler block C is out and the feeler block D is in. This tends to close both the ports 46 and 48 of each post 26 and 28 and will thus give a low reading on the indicator 24. If on the other hand the holes in the workpiece W are far apart, relatively speaking, then feeler element A is out, feeler element B is in, feeler element C is in, and feeler element D is out. This has a tendency to open up all of the ports 48 and 46, thus giving a high reading on the indicator. Thus by using a suitable master gauge to get a standard reading, it is possible to obtain, by a single reading, a gauge of whether or not center distances on the workpiece are in a proper range to permit use. The term "chordal distance" is sometimes used instead of center distance. Actually the device is checking wall distances on a common diameter, and assuming the holes are round (which can be suitably checked), the present gauge can be said to be actually a check of center distance.

I claim:
1. An air gauge for checking the relative location of spaced walls of spaced objects which comprises, a plurality of spaced mounting devices for receiving a work subject to be tested, each of said spaced mounting devices having in diametrically opposed walls contact feeler means, each of said devices having passages for the flow of air to said feeler means, said passages reaching atmosphere in said devices behind said feeler means, said feeler means being mounted to obstruct the flow of air from said passages to atmosphere in a degree proportional to the position of said feeler means relative to said devices, one of said means being movable to decrease the flow of air as it moves toward the device and the other of said feeler means being movable to increase the flow of air as its moves toward the device, said feeler means being mounted relative to each other in said devices in symmetrical relation.

2. A device as defined in claim 1 in which the mounting devices comprise parallel posts mounted on a supporting plate, each of said posts having opposed recesses on diametrically opposed walls, the feeler means in each post comprising movable blocks, one block pivotally mounted at one end in a recess, the other end being adapted to contact a work part on the outside surface and to affect the flow of air from one of said passages on its inside surface, the other feeler block in said posts being mounted centrally of its ends, one end being adapted on the outside surface to contact the surface of the work part and the other end being adapted on the inside surface to control the flow from one of said passages, each of said posts having similarly mounted blocks, the like blocks being mounted on opposite sides of the respective posts in symmetrical relation.

3. A device as defined in claim 1 in which the passages leading to said feeler means are connected to a single pneumatic air gauge reading device.

4. A device for checking the relative location of spaced walls of spaced holes which comprises a pair of parallel cylindrical posts, each having a pair of surface recesses extending axially of the posts and internal passages connected to said recesses, the first recess of each pair being connected at the top end of the post to said passages and the second of said recesses being connected at the bottom to said passages, a feeler block in said first recess pivoted at its bottom end having an outside contact surface at its upper end, and an inside surface contact at its upper end affecting the flow from said passages, and a feeler block in said second recess pivoted between its ends having an outside surface contact at the upper end and an inside surface contact at its lower end affecting the flow from said passages, the first recess on said pair of posts being formed on the far sides of said posts and the second of said recesses being formed on the near sides of said posts, the passages from said posts being pneumatically associated with a single pneumatic gauge reading device.

References Cited in the file of this patent

UNITED STATES PATENTS

| | | |
|---|---|---|
| 2,388,582 | Sorensen | Nov. 6, 1945 |
| 2,431,087 | Subber | Nov. 18, 1947 |
| 2,594,077 | Schulze | Apr. 22, 1952 |